United States Patent [19]
Shinbori et al.

[11] Patent Number: 6,128,040
[45] Date of Patent: Oct. 3, 2000

[54] RECORD MEDIUM ERASING DEVICE WITH VARIABLE CONTROL IN ACCORDANCE WITH POWER SUPPLY CHARACTERISTICS

[75] Inventors: Kenichi Shinbori; Masaya Maeda; Yuji Sakaegi, all of Kanagawa-ken, Japan

[73] Assignee: Canon Kabushiki Kaisha, Tokyo, Japan

[21] Appl. No.: 09/156,170

[22] Filed: Sep. 17, 1998

Related U.S. Application Data

[60] Continuation of application No. 07/963,087, Oct. 16, 1992, Pat. No. 5,831,945, which is a division of application No. 07/808,951, Dec. 13, 1991, Pat. No. 5,182,546, which is a continuation of application No. 07/307,328, Feb. 6, 1989, abandoned.

[30] Foreign Application Priority Data

| Feb. 12, 1988 | [JP] | Japan | 63-030335 |
| May 7, 1988 | [JP] | Japan | 63-111249 |
| Feb. 12, 1999 | [JP] | Japan | 63-030333 |

[51] Int. Cl.<sup>7</sup> ........................ H04N 5/225; H04N 5/228
[52] U.S. Cl. .......................... 348/372; 348/222; 386/69
[58] Field of Search ........................ 360/69; 369/47, 369/54, 116; 386/1.8, 46, 69, 70; 348/207, 222, 372, 373, 374; H04N 5/225, 5/228

[56] References Cited

U.S. PATENT DOCUMENTS

| 5,404,090 | 4/1995 | Shinbori | 307/66 |
| 5,444,644 | 8/1995 | Divjak | 324/602 |
| 5,652,891 | 7/1997 | Kitamura | 713/324 |
| 5,844,606 | 12/1998 | Suemoto | 348/375 |

FOREIGN PATENT DOCUMENTS

| 62-186679 | 8/1987 | Japan | H04N 5/781 |

*Primary Examiner*—Wendy Garber
*Assistant Examiner*—Ngoc-Yen Vu
*Attorney, Agent, or Firm*—Robin, Blecker & Daley

[57] ABSTRACT

An electronic apparatus capable of using power sources of different kinds each having a different characteristic is provided with an apparatus for controlling the operating mode of the electronic apparatus on the basis of the discrimination result provided by a discriminating switch, the discriminating switch being provided for discriminating the kind of a power source by means of the configuration of the electrodes of the power source. The electrodes of each kind of power sources is formed to have a different configuration. A recording or reproducing apparatus is also disclosed which controls the execution or non-execution of erasing operation in accordance with the result of discrimination of the kinds of power sources. In addition, a recording or reproducing apparatus is disclosed which is provided with an auto shut-off circuit for automatically shutting off the operation of a power source if an inoperative state continues for a predetermined time or more and which controls, in accordance with the result of discrimination of the kind of a power source, a set time period which elapses until an auto shut-off operation is started.

4 Claims, 13 Drawing Sheets

DETECTION SIGNAL

RECORD MEDIUM ERASING DEVICE WITH VARIABLE CONTROL IN ACCORDANCE WITH POWER SUPPLY CHARACTERISTICS

CROSS-REFERENCE TO RELATED APPLICATIONS

This application is a continuation of application Ser. No. 07/963,087, filed Oct. 16, 1992, now U.S. Pat. No. 5,831, 945 which is a divisional of application Ser. No. 07/808,951, filed Dec. 13, 1991, now U.S. Pat. No. 5,182,546, issued Jan. 26, 1993, which is a continuation of application Ser. No. 07/307,328, filed Feb. 6, 1989, now abandoned.

BACKGROUND OF THE INVENTION

1. Field of the Invention:

The present invention relates to a control device for electronic apparatus which can use a plurality of different kinds of power sources having different characteristics from each other.

2. Description of the Related Art:

Power sources for electronic apparatus have heretofore been designed so that the electronic apparatus can be driven by means of different kinds of power sources such as batteries, electrical power lines arranged in general houses (hereinafter referred to as "AC power source"), and power sources for automobiles, as well as with a view to improving the operability of the electronic apparatus. For this reason, in many electronic apparatus, the configurations of different kinds of power sources and those of various power source adapters are designed to be the same as that of a battery, whereby each of the power sources and power source adapters can be accommodated into a common battery compartment. The tendency of adopting such a design concept is outstanding particularly in the field of portable electronic apparatus.

In such an electronic apparatus which uses a plurality of different kinds of power sources, there are some cases where a means for judging the kind of an accommodated power source is provided since individual power sources have different characteristics, capacities and so forth or in order to inform the user what kind of power source is in use.

FIG. 1 is a perspective view showing one example of a conventional battery, with FIG. 2 being a perspective view showing one example of a conventional AC power source adapter. Each of the power sources can be accommodated into a battery compartment provided in an electronic apparatus, and is arranged to effect supply of electrical power by using in common a power supplying contact provided in the body of the electronic apparatus. FIG. 3 shows a state wherein the battery is accommodated, with FIG. 4 showing a state wherein the AC power source adapter is accommodated.

In FIGS. 1 to 4, the battery is denoted by 1, and a plus electrode 1a and a minus electrode 1b are provided on the battery 1. An AC power source adapter which is used as another power supplying device is denoted by 2, and a plus electrode 2a and a minus electrode 2b are provided on the AC power source adapter 2. The AC power source adapter 2 further includes an AC power source plug 3 and a projection 2c which serves to discriminate between the battery 1 and the AC power source adapter 2. A battery compartment formed in an electronic apparatus is indicated at 4. A plus contact piece 5a, which is provided in the battery compartment 4, is connected to the plus electrode 1a of the battery 1 or the plus electrode 2a of the AC power source adapter 2. A minus contact piece 5b, which is likewise provided in the battery compartment 4, is connected to the minus electrode 1b of the battery 1 or the minus electrode 2b of the AC power source adapter 2. A micro-switch 6 is provided in the battery compartment 4, and serves to identify the kind of an accommodated power source by detecting the presence or absence of the projection 2c.

In the above-described arrangement and construction, if the battery 1 is accommodated into the battery compartment 4, as can be seen from FIG. 3, the micro-switch 6 is not switched on and remains off since no projection is formed on the battery 1. If the AC power source adapter 2 is accommodated in the battery compartment 4, an activating element of the micro-switch 6 is pressed by the projection 2c, as shown in FIG. 4, and thus the micro-switch 6 is switched on.

In this manner, on the basis of the on-off action of the micro-switch 6, it is possible to judge whether the battery 1 or the AC power source adapter 2 is accommodated in the battery compartment 4, that is, the kind of a power source.

In the above-described conventional example, however, since it is necessary to make the configuration of the battery 1 differ from that of any power supplying device other than the battery 1 in order to judge the kind of a power source, there is a need to form a large space for the battery compartment 4 in the electronic apparatus. Accordingly, the conventional example has the disadvantage that it is difficult to miniaturize the electronic apparatus. In addition, it is necessary to use as a detecting means an expensive electronic part such as a micro-switch and to strictly set the retaining structure and mounting position of the micro-switch in order to positively switch on and off the micro-switch. Accordingly, there is a disadvantage in that the construction of the electronic apparatus becomes complicated and expensive.

In the field of video tape recorders and electronic cameras which have rapidly come into wide use in recent years, in order to enable outdoor photography, it is particularly essential that such an electronic apparatus be reduced in size and weight and can be driven by a battery. In addition, the aforesaid recorders and cameras are designed so that they can use an AC power source in a place provided with the AC power source or the like in order to effect long-time recording or to reproduce and edit photographed image information for a long time.

It is also necessary that such an electronic apparatus be provided with an erasing function in order to enable a recording mode, a reproducing mode and an erasing mode for erasing unnecessary information recorded on a recording track to thereby enable re-recording on the recording track. Such modes are commonly incorporated in accordance with the range of applications of the electronic apparatus. However, since power consumption depends upon the kinds of modes incorporated, it is necessary to give consideration to the kind of a power source to be used.

Needless to say, where a battery is used as a power source, it is always necessary to give consideration to the duration of the battery. In addition, if the battery is consumed during photography and hence photographing operation becomes impossible, serious problems may occur. For example, a photographing chance may be missed or normal recording may become impossible. For this reason, it is necessary to adopt a contrivance for minimizing the consumption of the battery during the use thereof. However, if the capacity of the battery is merely enlarged as such a contrivance, the size of the battery itself and hence the weight must be increased. The resulting problem is that small size and light weight both of which constitute features of a portable apparatus are damaged.

Problems similar to the above-described problems occur during a reproducing mode. In general, no problem occurs in a recording mode in which the time required for one photographing cycle is short. However, in the case of reproducing operation in particular, the time period of operation varies depending upon each individual operator and, if the aforementioned recorder or camera is operated for a long time, the battery will be consumed to a great extent. For this reason, the above recorder or camera is provided with a so-called auto shut-off mechanism which is arranged to automatically switch off a power source if an inoperative state continues for a predetermined time period or more (for example, several minutes), thereby preventing the consumption of the power source and the abrasion of a head and a disc.

However, even if an AC power source whose power consumption is not a critical problem, the auto shut-off mechanism will operate in several minutes to automatically switch off the AC power source. This leads to the disadvantages that the number of operations increases, that the complexity of operation increases, and that the operability deteriorates. If the time period which elapses until the auto shut-off mechanism is started is extended in correspondence with the AC power source, or if the auto shut-off mechanism is eliminated, it is impossible to solve the above-described problem that the battery is consumed when in use. Accordingly, the use of the battery and the AC power source involves a contradictory problem.

SUMMARY OF THE INVENTION

It is, therefore, a primary object of the present invention to provide a control device for electronic apparatus which is capable of solving the above-described problems.

It is another object of the invention to detect, through a simple construction, the kind of a power source which is used to supply electrical power to an apparatus, as well as to provide a highly reliable apparatus in which discrimination information obtained from such a construction is adapted to various forms of control.

It is another object of the invention to make it possible to construct a means for judging the kind of a power source without any need to form a special space in an electronic apparatus, thereby enabling a reduction in the overall size of the electronic apparatus, as well as to reduce the manufacturing cost by minimizing the differences among the configurations of the cases of power sources of different kinds.

To achieve the above objects, in accordance with one aspect of the present invention, there is provided an electronic apparatus capable of using a plurality of power source units each having different characteristics from each other. The electronic apparatus is provided with a power source unit compartment capable of accommodating each of the plurality of power source units in common, and detecting means disposed in the power source unit compartment for detecting a pattern of configuration of a connecting electrode of a power source unit accommodated in the power source unit compartment among the plurality of power source units to detect a characteristic of the accommodated power source unit.

It is another object of the present invention to provide a highly reliable electronic apparatus by detecting the characteristic of a power source, exerting control over an operating mode according to the characteristic of the power source, and effectively utilizing the power source.

To achieve the above object, in accordance with another aspect of the present invention, there is provided an electronic apparatus which has a plurality of operating modes and which is capable of receiving a supply of electrical power from a plurality of power source devices having different characteristics from each other. The electronic apparatus is provided with operating mode setting means for setting each of the plurality of operating modes, detecting means for detecting a characteristic of a power source device accommodated in the electronic apparatus among the plurality of power source devices, and control means for controlling an operation of the operating mode setting means in accordance with the characteristic detected by the detecting means.

It is another object of the present invention to provide an erasing apparatus which is capable of effecting erasing operation according to the capacity of a power source by inhibiting the erasing operation during the use of a battery or any other power source whose capacity is limited and preventing the rapid consumption of such a power source, by noting the fact that when an erasing mode for erasing information recorded on a recording track is selected during the operation of an electronic camera or the like, the power consumption of the electronic camera increases since an extremely large amount of current is needed in the erasing mode, that is to say, it is not preferable to carry out an erasing operation when a battery is in use, as well as the fact that erasing operation is commonly seldom carried out during outdoor photography.

To achieve the above object, in accordance with another aspect of the present invention, there is provided an erasing apparatus which is provided with erasing means for erasing arbitrary information recorded on a recording medium, detecting means for detecting a characteristic of a power source device accommodated in the erasing apparatus, and control means for controlling an operation of the erasing means in accordance with the characteristic detected by the detecting means.

It is another object of the present invention to provide a recording apparatus suitable for use in an electronic camera or the like of the type which employs a battery or any other small-capacity power source and whose power consumption is a critical problem, the recording apparatus being capable of preventing the occurrence of malfunctions or mistakes in photography due to the consumption of a power source by inhibiting an erasing operation when a power source having a small capacity is in use.

To achieve the above object, in accordance with another aspect of the present invention, there is provided a recording apparatus which is provided with recording means for recording information on a recording medium, erasing means for erasing arbitrary information recorded on the recording medium, detecting means for detecting a characteristic of a power source device accommodated in the recording apparatus, and control means for controlling an operation of the erasing means in accordance with the characteristic detected by the detecting means.

It is another object of the present invention to provide a reproducing apparatus in which it is possible to realize improvements in both the consumption of a power source and the operability of the apparatus itself by varying the period of an auto shut-off time during reproduction in accordance with the result of discrimination of the kind of a power source. In such a reproducing apparatus, if it is determined, as the result of the discrimination, that electrical power is supplied from a battery whose power consumption is a critical problem, the auto shut-off time is shortened to prevent unnecessary power consumption, while, if it is determined, as the result of the discrimination, that electrical power is supplied from an AC power adapter whose power consumption is not critical, the auto shut-off time is extended within a range in which abrasion does not occur in a magnetic head or a recording medium, whereby complicated operation can be omitted.

To achieve the above object, in accordance with another aspect of the present invention, there is provided a reproducing apparatus which is provided with reproducing means for reproducing information recorded on a recording medium, detecting means for detecting a characteristic of a power source which supplies electrical power to the reproducing apparatus, and control means for controlling an operation of the reproducing means in accordance with the characteristic detected by the detecting means.

It is another object of the present invention to provide an electronic apparatus capable of preventing unwanted consumption of a power source by changing, in accordance with the capacity of the power source, the duration thereof which is required until an operating mode is automatically cancelled.

To achieve the above object, in accordance with another aspect of the present invention, there is provided an electronic apparatus which is provided with operating mode setting means for selectively setting a plurality of operating modes, mode cancelling means for cancelling an operating mode set by the operating mode setting means among the plurality of operating modes when a predetermined set period of time has elapsed, detecting means for detecting a characteristic of a power source device which supplies electrical power to the electronic apparatus, and control means for controlling a timing at which the mode cancelling means is activated, by changing the set period of time in accordance with the characteristic detected by the detecting means.

The above and other objects, features and advantages of the present invention will become apparent from the following description of the preferred embodiments thereof, taken in conjunction with the accompanying drawings.

DETAILED DESCRIPTION OF THE PREFERRED EMBODIMENTS

Preferred embodiments of a control device for an electronic apparatus in accordance with the present invention will be described in detail below with reference to the accompanying drawings.

Figure 1:
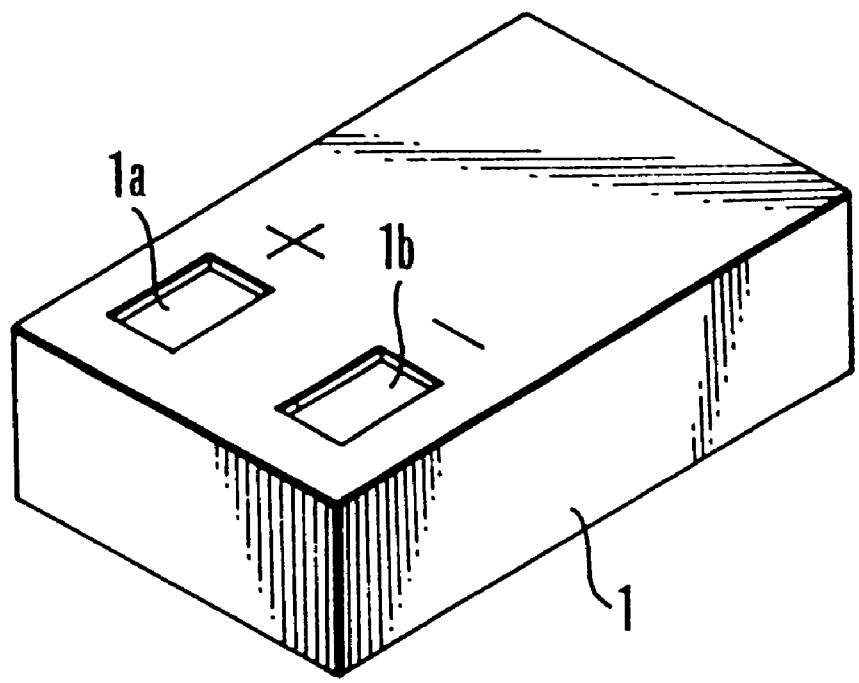
FIG. 1 is a perspective view showing a battery for use in a conventional electronic apparatus.
Figure 2:
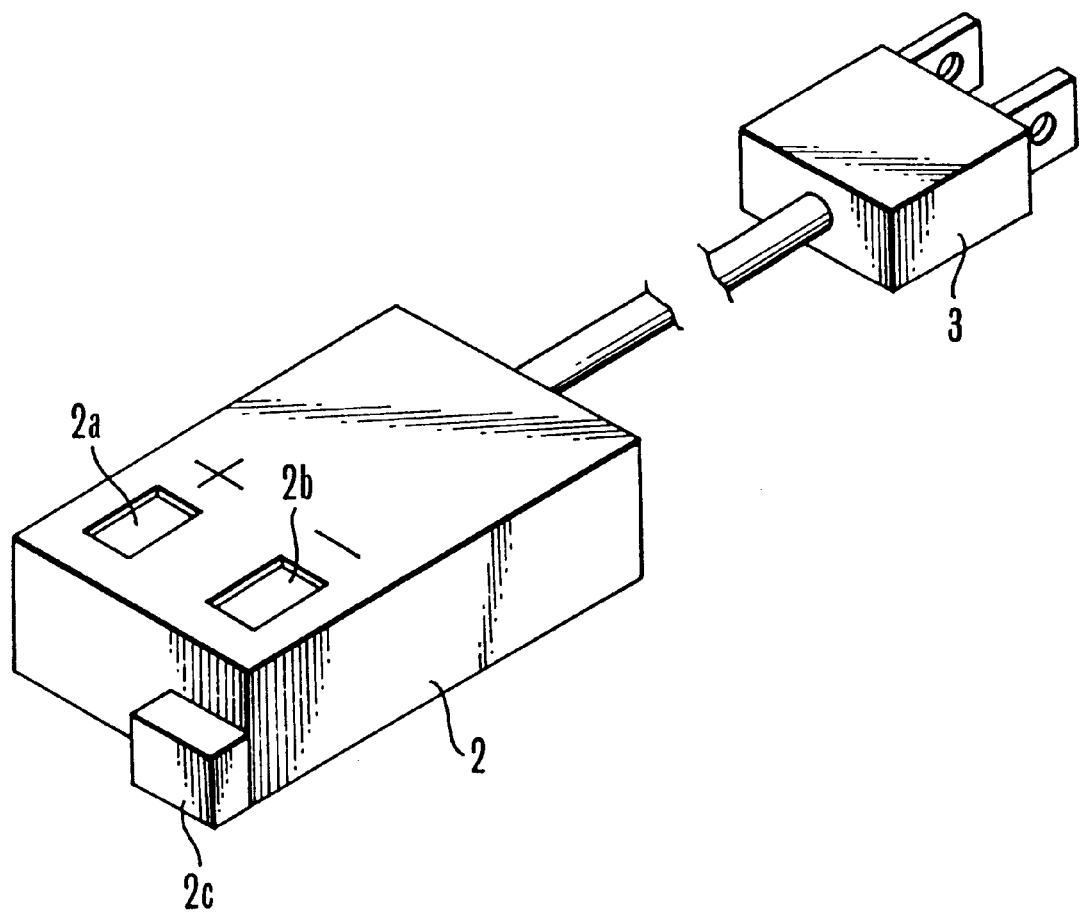
FIG. 2 is a perspective view showing a conventional AC power source adapter.
Figure 3:
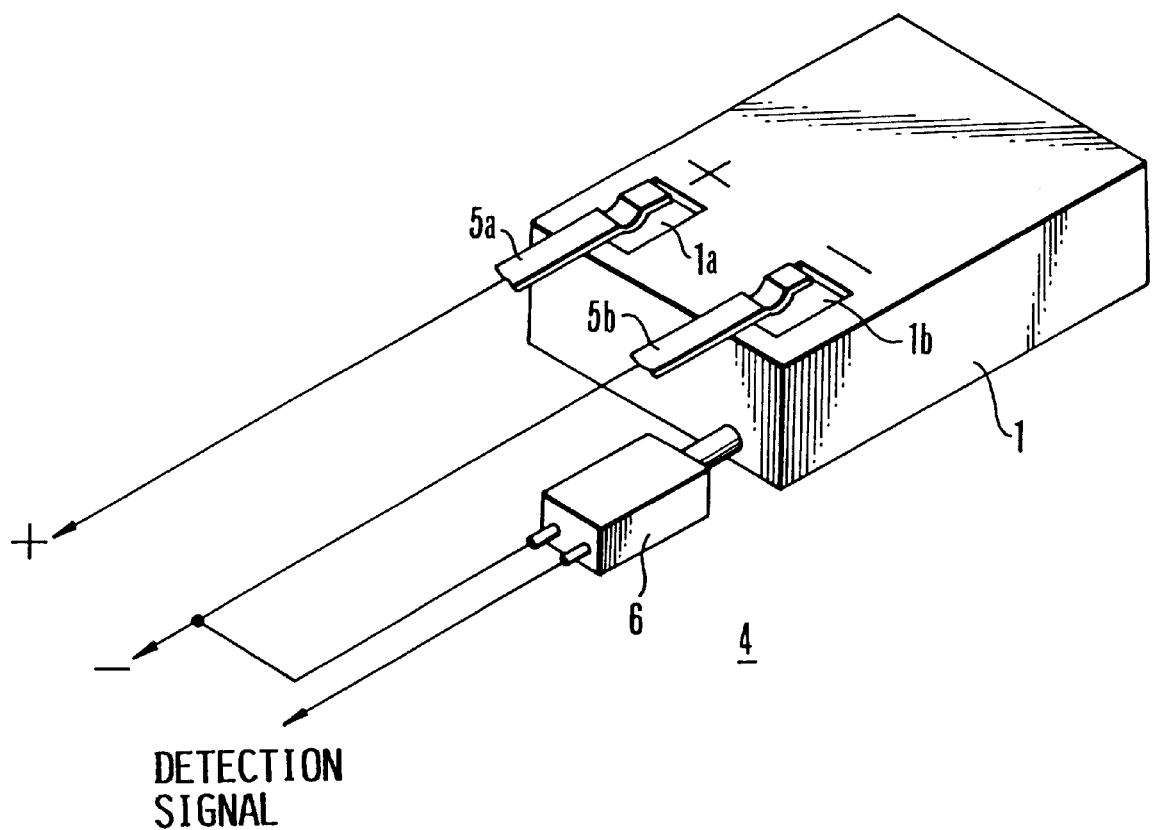
FIG. 3 is a perspective view showing a state wherein the battery of FIG. 1 is accommodated in the convention electronic apparatus.
Figure 4:
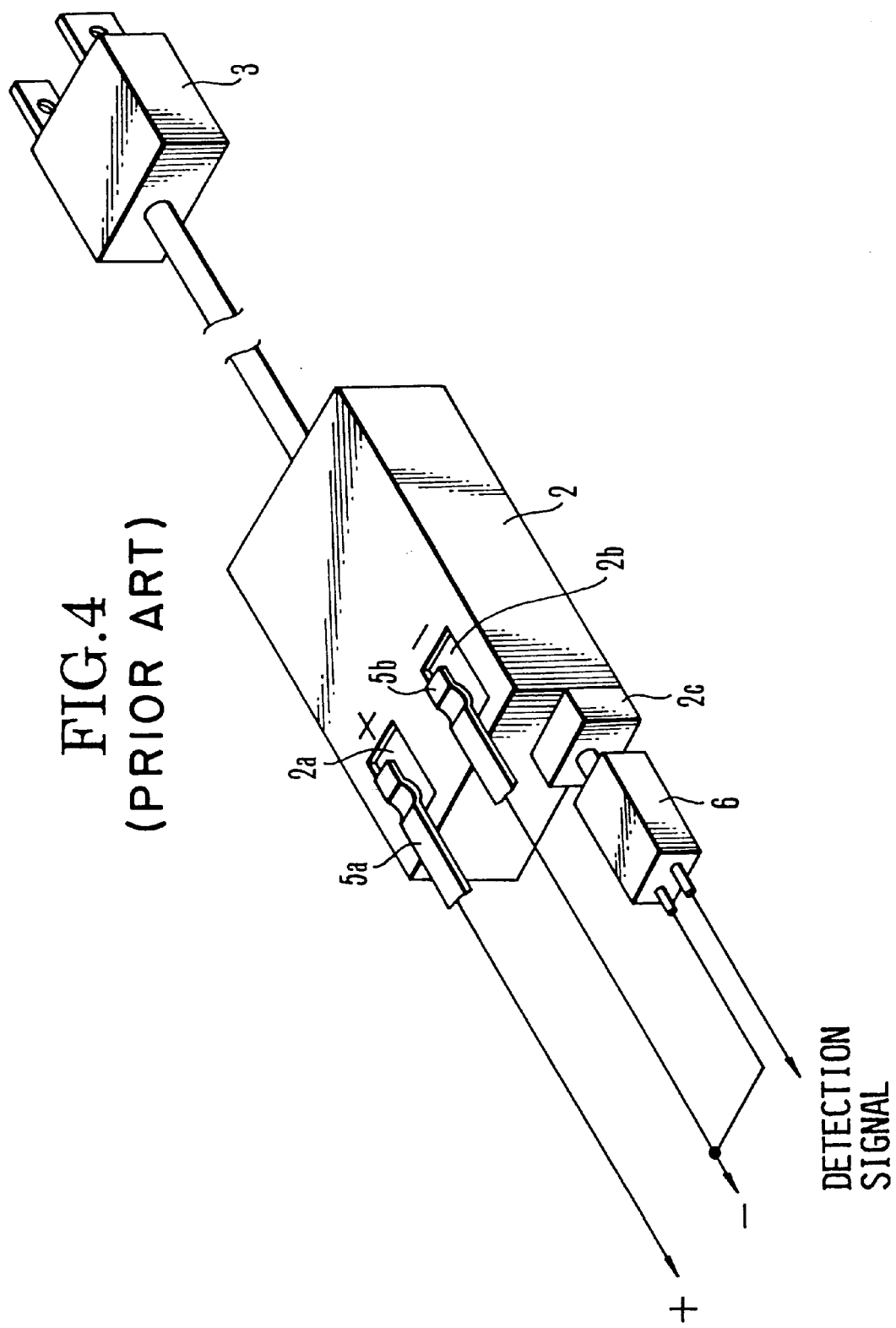
FIG. 4 is a perspective view showing a state wherein the conventional AC power source adapter of FIG. 2 is accommodated into the conventional electronic apparatus.
Figure 5:
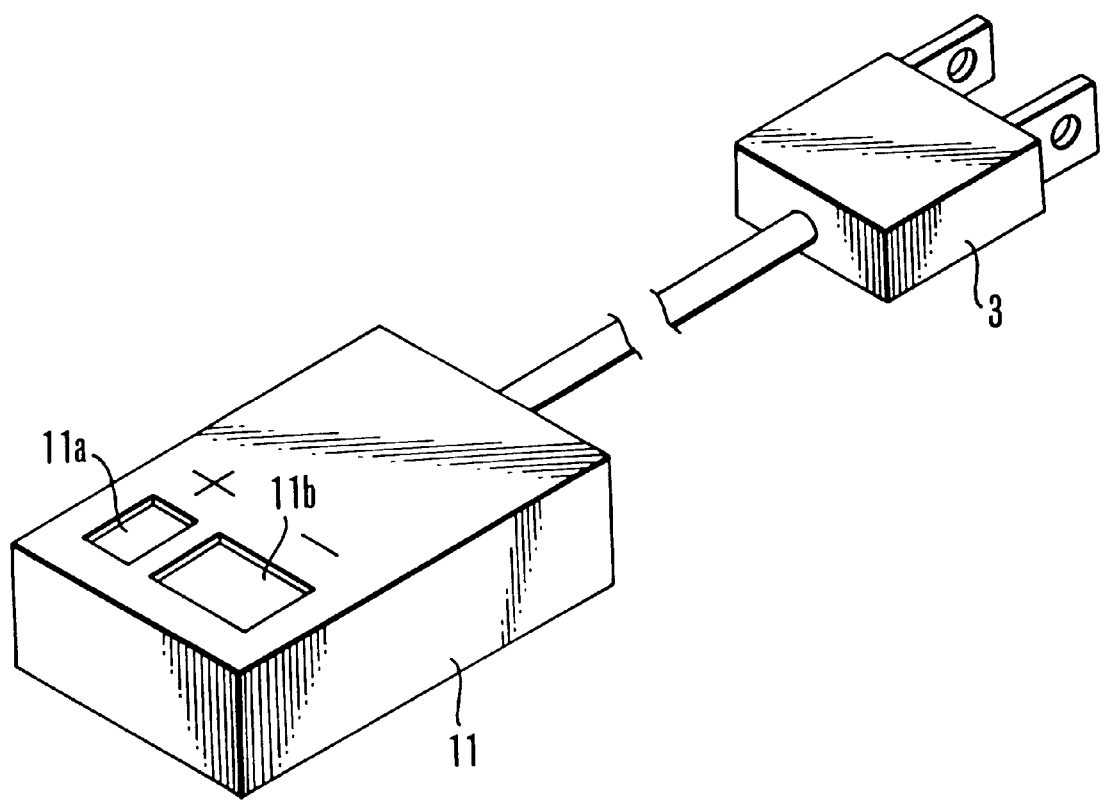
FIG. 5 is a perspective view showing an AC power source adapter according to a first embodiment of the present invention.
Figure 6:
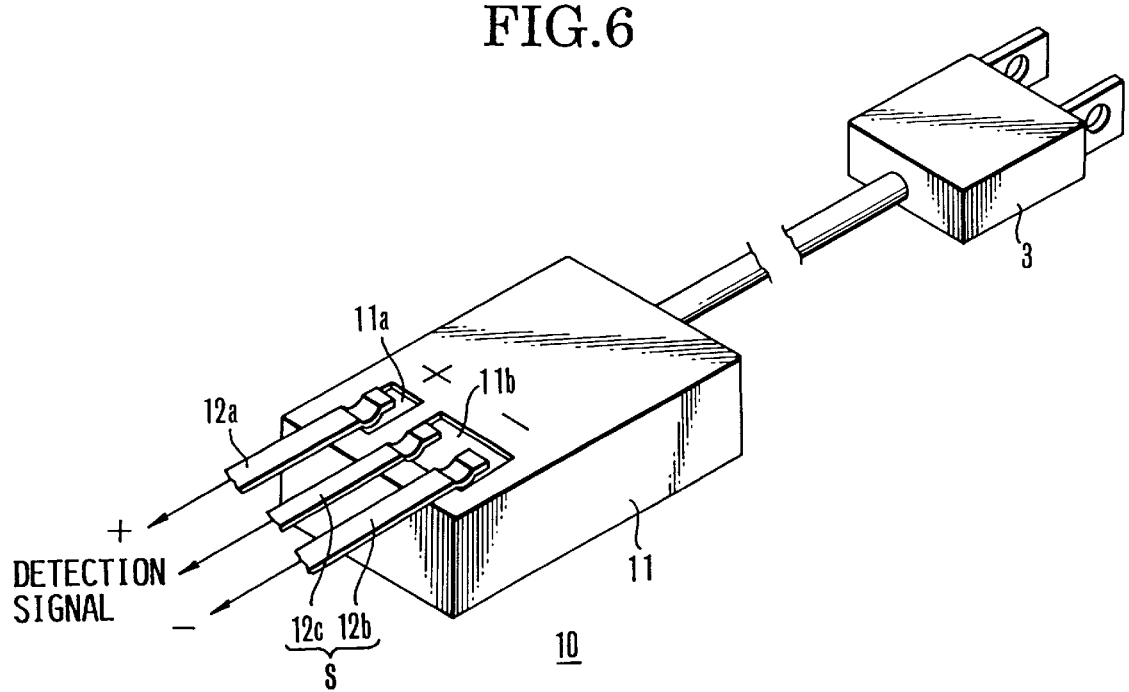
FIG. 6 is a perspective view showing a state wherein the AC power source adapter of FIG. 5 is accommodated.
Figure 7:
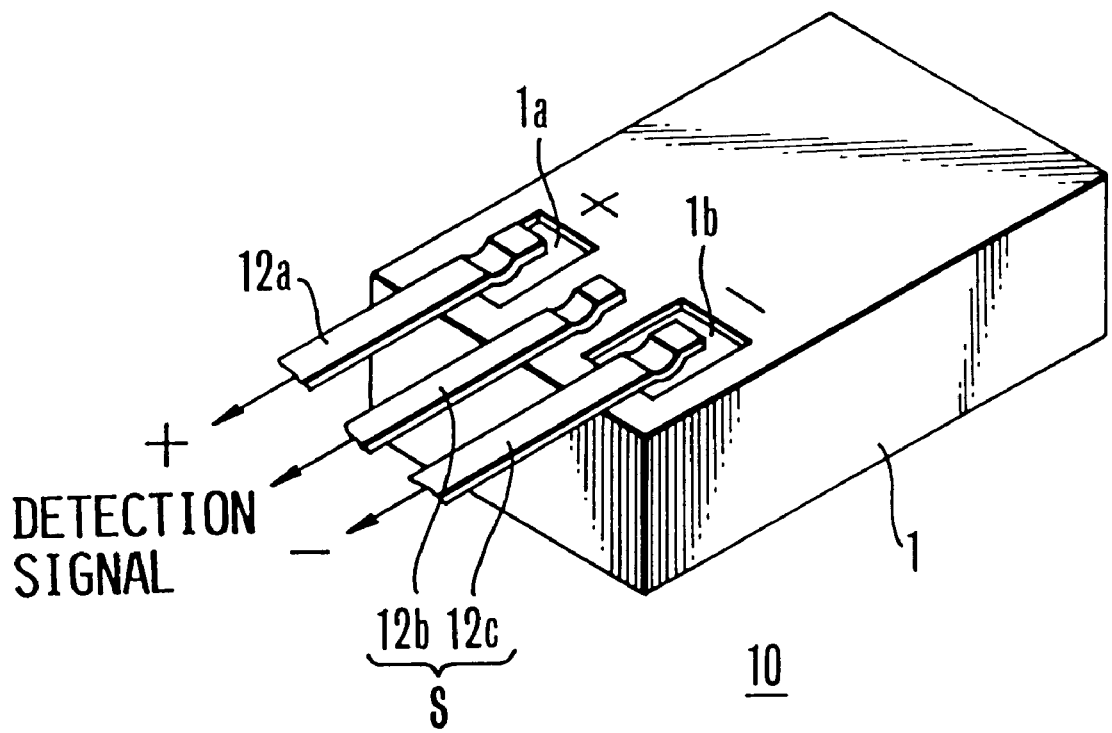
FIG. 7 is a perspective view showing a state wherein a battery is accommodated in the first embodiment of the present invention.

FIGS. 5 to 9 respectively show one embodiment of a power source discriminating means for discriminating between, for example, a battery and an AC power source adapter in accordance with the present invention. FIG. 5 is a perspective view showing the AC power source adapter, FIG. 6 is a perspective view showing a state wherein the AC power adapter is accommodated in a battery compartment in an electronic apparatus, and FIG. 7 is a perspective view showing a state wherein the battery is accommodated in the same. The elements which are the same as those used in the conventional example shown in FIGS. 1 to 4 will be explained by using the same reference numerals.

In FIGS. 5 to 9, the battery compartment formed in the electronic apparatus is denoted by 10, and an AC power source adapter 11 is provided with an AC power source plug 3. A plus electrode 11a and a minus electrode 11b are provided on an upper surface of the AC power source adapter 11 which corresponds to the surface of the battery 1 having the plus electrode 1a and the minus electrode 1b. One of the electrodes 11a and 11b, for example, the minus electrode 11b is formed to have a width greater than that of the electrode 1b of the battery 1.

In the battery compartment 10 of the electronic apparatus, there are provided a plus contact piece 12a and a minus contact piece 12b both of which serve as power supply terminals. When the battery 1 or the AC power source adapter 11 is accommodated in the battery compartment 10, the plus contact piece 12a is connected to the plus electrode 1a of the battery 1 or the plus electrode 11a of the AC power source adapter 11, with the minus contact piece 12b connected to the minus electrode 1b or the minus electrode 11b. In the battery compartment 10, there is further provided a discriminating contact piece 12c. When the battery 1 is accommodated in the battery compartment 10, the discriminating contact piece 12c, as shown in FIG. 7, is not connected to either the plus electrode 1a or the minus electrode 1b. On the other hand, when the AC power source adapter 11 is accommodated, the piece 12c together with the minus contact piece 12b, as shown in FIG. 6, is connected to the minus electrode 11b which is formed to have an enlarged width. The contact pieces 12b and 12c are arranged to form a switch S independently of the circuit associated with the supply of electrical power. If the battery 1 is accommodated, the contact pieces 12a and 12b for supply of electrical power are connected to the corresponding electrodes 1a and 1b, but the discriminating contact piece 12c makes contact with the upper surface of the battery 1 alone and does not come into contact with either the electrode 1a or the electrode 1b. Therefore, the switch S constituted by the contact pieces 12b and 12c is opened.

If the AC power source adapter 11 is accommodated, the contact pieces 12a and 12b for supply of electrical power are connected to the respective electrodes 11a and 11b to form a power supply path, with the discriminating contact piece 12c connected to the electrode 11b. Therefore, the contact pieces 12b and 12c are electrically connected to each other by the electrode 11b and thus the switch S is closed. In this fashion, on the basis of the on-off action of the switch S, it is possible to electrically discriminate between the cases where the battery 1 is accommodated in the battery compartment 10 and where the AC power source adapter 11 is accommodated in the same.

The above embodiment is described with illustrative reference to the structure in which the minus electrode 11b of the AC power source adapter 11 is formed to have such an enlarged width that allows the contact piece 12b and the discriminating contact piece 12c to be electrically connected to each other. However, another structure may be adapted in which the plus electrode 11a of the AC power source adapter 11 is formed to have such an enlarged width that allows the contact piece 12a and the discriminating contact piece 12c to be electrically connected to each other.

The following is an illustrative description of a case where discrimination information provided by the above-described discriminating means for discriminating the kind of a power source is employed to control the operating mode of an electronic apparatus, concretely, a case where such discrimination information is employed to control the erasing operation of the electronic apparatus.

Figure 10:
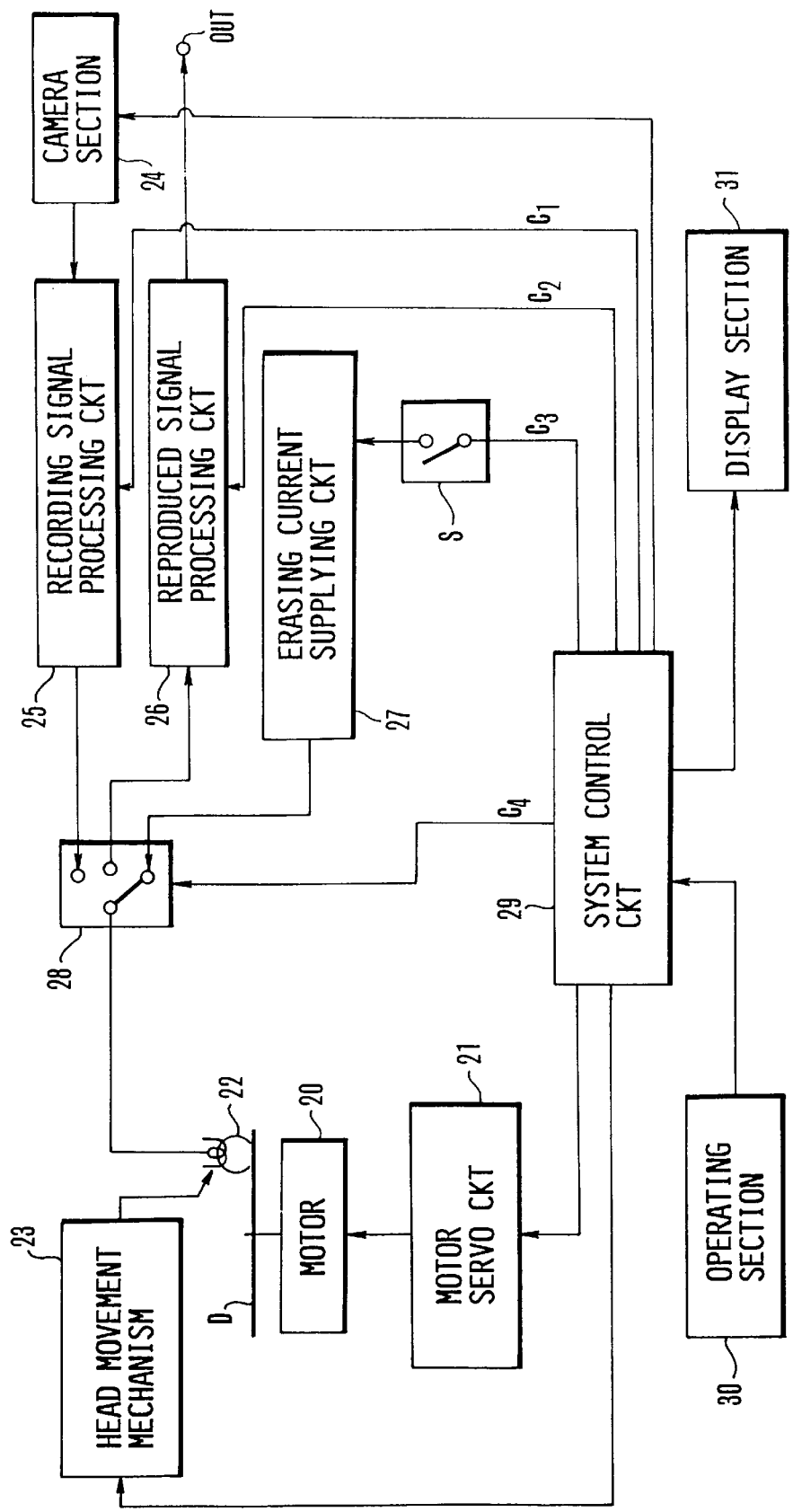
FIG. 10 is a block diagram showing a recording or reproducing apparatus in which a power source discriminating device is used for the control of an erasing mode.

FIG. 10 is a block diagram showing a case where the present invention is applied to an electronic camera arranged to record image information or sound information on concentric tracks of a rotating magnetic disc or reproduce such information from the same.

This kind of electronic camera needs to have a portable form and it is very important that such a camera has a small size and a light weight. Accordingly, it is an indispensable requirement that batteries can be used particularly during recording, that is, during photography. In addition, it is necessary to provide the electronic camera with various modes such as a reproducing mode for reproducing an image recorded on a recording medium and an erasing mode for erasing unnecessary information recorded on a track to enable re-recording on the track.

Needless to say, where a battery is used as a power source, it is always necessary to give consideration to the duration of the battery. In addition, if the battery is consumed during photography and thus photographing operation becomes impossible, serious problems may occur; for example, a photographing chance may be missed or normal recording may become impossible. For this reason, it is necessary to adopt a contrivance for minimizing the consumption of the battery when it is in use. Accordingly, each of the present embodiments is arranged to inhibit erasing operation itself if it is determined that a battery is in use, by means of the aforesaid switch S serving as means for discriminating the kind of a power source, and to allow an erasing operation if electrical power is supplied through an AC power source adapter connected to a home-use AC power source and it is, therefore, unnecessary to take account of power consumption. Such an arrangement is accomplished by noting the fact that, when an erasing mode for erasing information recorded on a recording track is selected during the operation of the electronic camera or the like, the power consumption of the electronic camera increases since an extremely large amount of current is needed in the erasing mode, that is to say, it is not preferable to carry out an erasing operation when a battery is in use, as well as the fact that erasing operation is commonly seldom carried out during outdoor photography.

Referring to FIG. 10, a magnetic disc serving as a recording medium is indicated at D. A disc rotating motor is indicated at 20, and a motor servo circuit 21 is disposed to control the rotary motion of the motor 20. A magnetic head 22 is arranged to move back and forth in the radial direction of the rotating magnetic disc D to effect recording or reproduction on or from concentric tracks. A head movement mechanism 23 is arranged to cause the head 22 to move to a desired track position on the magnetic disc D. A camera section 24 is constituted by an optical system including a photographing lens, a diaphragm, a shutter, an imaging device for converting image information photographed by the optical system into electrical signals, and so forth. A recording signal processing circuit 25 operates under the control of a control signal $C_1$ supplied from a system control circuit 29 which will be described later, and is arranged to effect processings, such as frequency modulation and preemphasis, on the image information signal output from the camera section 24, convert the signal into a signal suitable for recording on the magnetic disc D, and supply the converted signal to the magnetic head 22. A reproduced signal processing circuit 26 operates under the control of a control signal $C_2$ supplied from the system control circuit 29, and is arranged to convert the image signal which has been reproduced from a track on the magnetic disc D by the magnetic head 22 into the original image signal by effecting predetermined signal processings on the produced image signal, to convert the signal into a signal suitable for supply to a monitor (not shown), and to output the thus-converted signal to the monitor. An erasing current supplying circuit 27 operates under the control of a control signal $C_3$ supplied from the system control circuit 29, and is arranged to supply an erasing current to the magnetic head 22. A mode selector switch 28 is responsive to a control signal $C_4$ from the system control circuit 29 for selecting from among the recording signal processing circuit 25, the reproduced signal processing circuit 26 and the erasing current supplying circuit 27 in accordance with each individual mode. The system control circuit 29 provides control, in accordance with each mode, over the operation of the overall system of the recording or reproducing apparatus, such as the head movement mechanism 25, the reproduced signal processing circuit 26, the erasing current supplying circuit 27, the camera section 24 and the mode selector switch 28. An operating section 30 is constituted by a plurality of operating buttons (not shown) for giving a command corresponding to each mode to the system control circuit 29. A display section 31 provides display of the state of control exerted over the recording or reproducing apparatus by the system control circuit 29 as well as information associated with each mode. A reproduced-signal output terminal OUT is disposed to output to an external circuit the reproduced signal output from the reproduced signal processing circuit 26.

The above-described switch S for discriminating the kind of a power source is disposed at an intermediate location on a line for supply of the control signal $C_3$ which is output from the system control circuit 29 to control the operation of the erasing current supplying circuit 27.

Accordingly, if a desired mode is selected through the operating section 30, the system control circuit 29 controls the operation of each circuit to execute setting of a corresponding mode. In accordance with each selected operating mode, the movement of the magnetic head 22 and the rotation of the magnetic disc D are controlled and, at the same time, each control state is displayed at the display section 31.

If the erase mode is selected through the operating section 30, the system control circuit 29 outputs the control signal $C_4$ so that the mode selector switch 28 is connected to the erasing current supplying circuit 27. As described above, if the AC power source adapter 11 is accommodated in the battery compartment 10 and the switch S is closed, the system control circuit 29 outputs the control signal $C_3$ so that the erasing current supplying circuit 27 is activated to supply an erasing current to the magnetic head 22, thereby erasing the information recorded on the track opposing the magnetic head 22. If the battery 1 is accommodated in the battery compartment 10 and the switch S is opened, no control signal $C_3$ is supplied from the system control circuit 29 to the erasing current supplying circuit 27 so that the erasing current supplying circuit 27 is not activated and the information recorded on the magnetic disc D is not erased.

Incidentally, in response to the on-off action of the switch S, the display section 31 displays both what kind of power source is presently accommodated in the battery compartment 10 and the fact that an erasing operation is impossible during the use of the battery 1.

For the sake of easy understanding, in the above-described recording or reproducing apparatus, the operation of the erasing current supplying circuit 27 is controlled by switching the control signal $C_3$ applied from the system control circuit 29 to the erasing current supplying circuit 27. In the case of an actual circuit design, it is also possible to easily realize an arrangement in which the state of the switch S is supplied to the system control circuit 29 to control the manner of outputting of the control signal $C_3$ itself.

Figure 8:
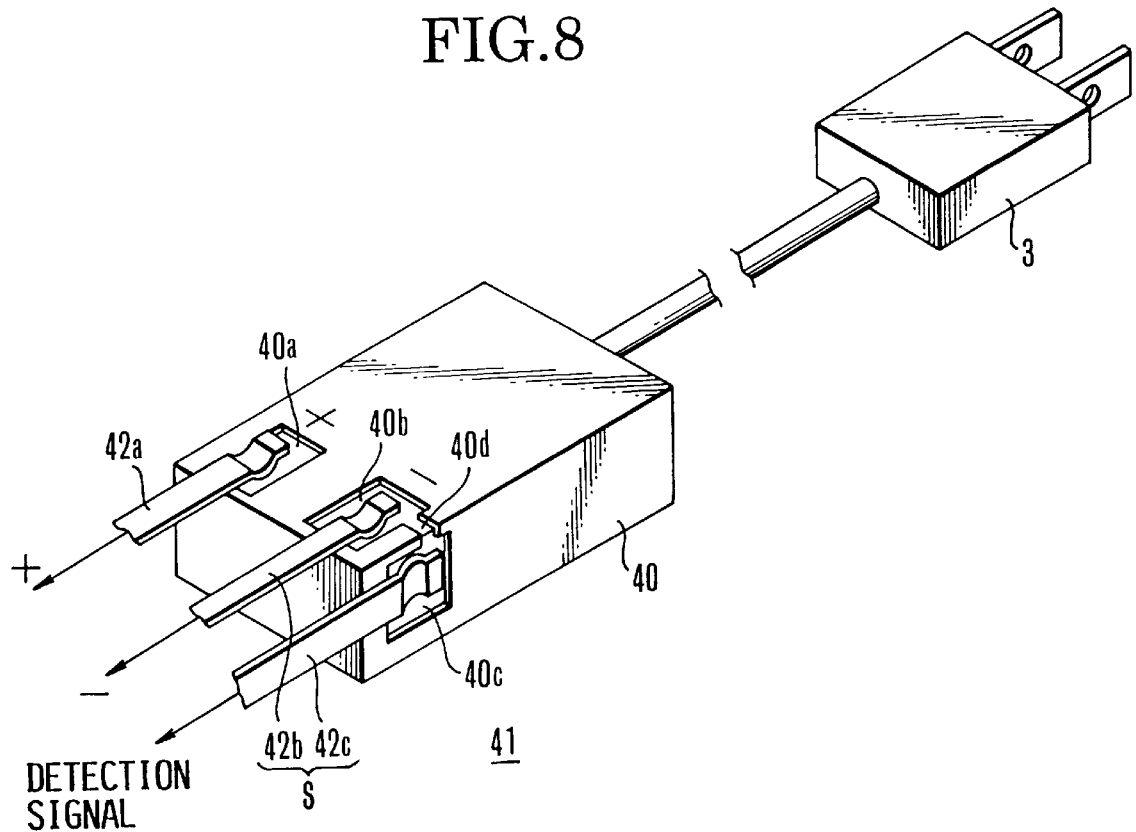
FIG. 8 is a perspective view showing a state wherein an AC power source adapter according to a second embodiment of the present invention is accommodated.
Figure 9:
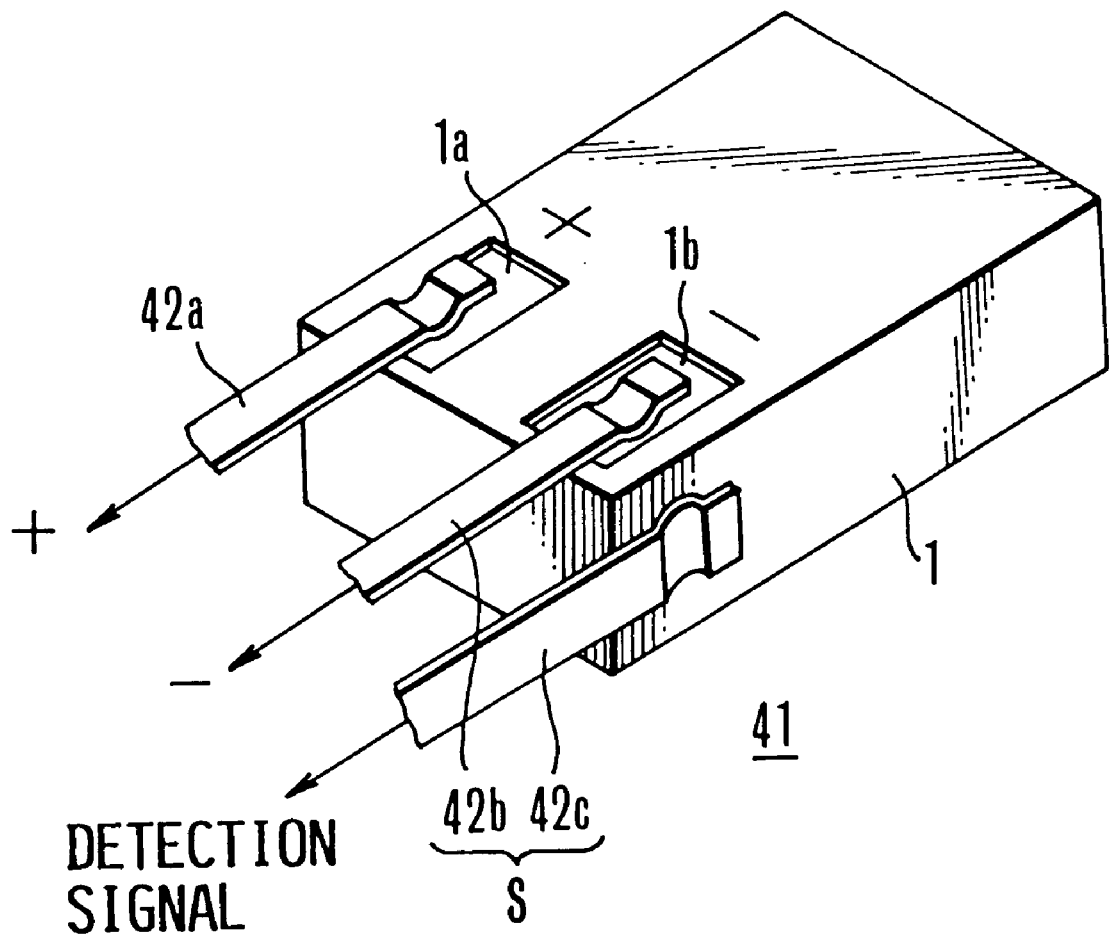
FIG. 9 is a perspective view showing a state wherein a battery is accommodated in the second embodiment of the present invention.

FIGS. 8 and 9 respectively show other embodiments of the power source discriminating means according to the present invention.

In FIGS. 8 and 9, an AC power source adapter, which is indicated at 40, has a plus electrode 40*a* and a minus electrode 40*b*. The AC power source adapter 40 further has a power source discriminating electrode 40*c* which is electrically connected to the minus electrode 40*b* through an electrically conducting portion 40*d*. The power source discriminating electrode 40*c* is formed on a side which differs from a side provided with the minus electrode 40*b*. A battery compartment in an electronic apparatus is indicated at 41 and, power supplying contact pieces 42*a* and 42*b*, which are provided in the battery compartment 41, are arranged to make contact with the respective electrodes 40*a* and 40*b* when the AC power source adapter 40 is accommodated in the battery compartment 41. A power source discriminating electrode 42*c*, which is provided in the battery compartment 41, is combined with the contact piece 42*b* to constitute the power source discriminating switch S.

As shown in FIG. 8, if the AC power source adapter 40 is accommodated in the battery compartment 41, the switch S constituted by the contact pieces 42*b* and 42*c* is closed by the minus electrode 40*b* and the power source discriminating electrode 40*c*, whereby it is possible to detect the fact that the AC power source adapter 40 is accommodated.

As shown in FIG. 9, if the battery 1 is accommodated in the battery compartment 41, the power source discriminating contact piece 42*c* alone comes into contact with a corresponding side surface of the battery 1. Accordingly, the contact pieces 42*b* and 42*c* are not electrically connected and the switch S is opened, whereby it is possible to detect the fact that the battery 1 is accommodated.

Needless to say, the power source discriminating electrode 40*c* may be formed with the plus electrode 40*a*. The position of the discriminating electrode 40*c* is not limited to the upper or side surface of the AC power source adapter 40, and such an electrode may be formed at any location where it can be electrically connected to one of the power supplying electrodes 40*a* and 40*b*.

The above embodiment has been explained with reference to the case where it is necessary to discriminate between the battery and the AC power adapter, but the combination of the battery and the AC power adapter is not a restrictive one. The range of applications of the above-described embodiment is wide and, therefore, it can be combined with another type of DC power source adapter having a different voltage level, another type of battery having a different capacity, an externally connected battery having a large capacity, or the like.

The above embodiment has been explained with reference to the case where it is necessary to discriminate between two kinds of power sources. However, it is possible to discriminate more than two kinds of power sources by altering the number of discriminating electrodes and contact pieces as well as the positions at which they are formed.

As described above, in accordance with the present invention which provides the above power source device for electronic apparatus, it is possible to realize, with a simple construction and at low cost, means for discriminating the kinds of power source in an electronic apparatus of the type capable of using a plurality of power sources including a battery and a power source different from the battery, for example, an AC power source adapter. Further, if the discrimination information obtained from the discriminating means is adapted to various forms of control, it is possible to provide a highly reliable apparatus. In addition, since it is possible to construct the means for discriminating the kind of a power source without any need to form a special space in an electronic apparatus, the above embodiment provides the effect of enabling a reduction in the overall size of the electronic apparatus. Since the configuration of the case of the battery and that of the case of another power source, for example, an AC power source adapter, can be made extremely analogous to each other, it is possible to use a mold for batteries as that for AC power source adapters, or vice versa, thereby reducing the manufacturing cost.

In the above-described recording or reproducing apparatus capable of using a plurality of power sources including a battery and a power source of the type different from the battery, for example, an AC power source adapter, means for discriminating the kind of a power source are provided, whereby the operating mode of the apparatus is controlled on the basis of the result of the discrimination provided by the above means. Accordingly, it is possible to effectively use various power sources: for example, it is possible to inhibit erasing operation when a battery is in use, thereby preventing the consumption of the battery from being accelerated due to erroneous starting of the erasing operation, during the use of the battery, which requires a large power consumption. Further, it is possible to enhance the reliability of the recording or reproducing apparatus.

The following is a description of another embodiment of the recording or reproducing apparatus whose operating mode is controlled on the basis of the result of the discrimination provided by the above power source discriminating means.

This embodiment will be described with illustrative reference to an arrangement capable of altering the length of a so-called auto shut-off time in accordance with the result of discrimination of the kind of a power source, the power source being automatically switched off when the auto shut-off time has elapsed.

Figure 11:
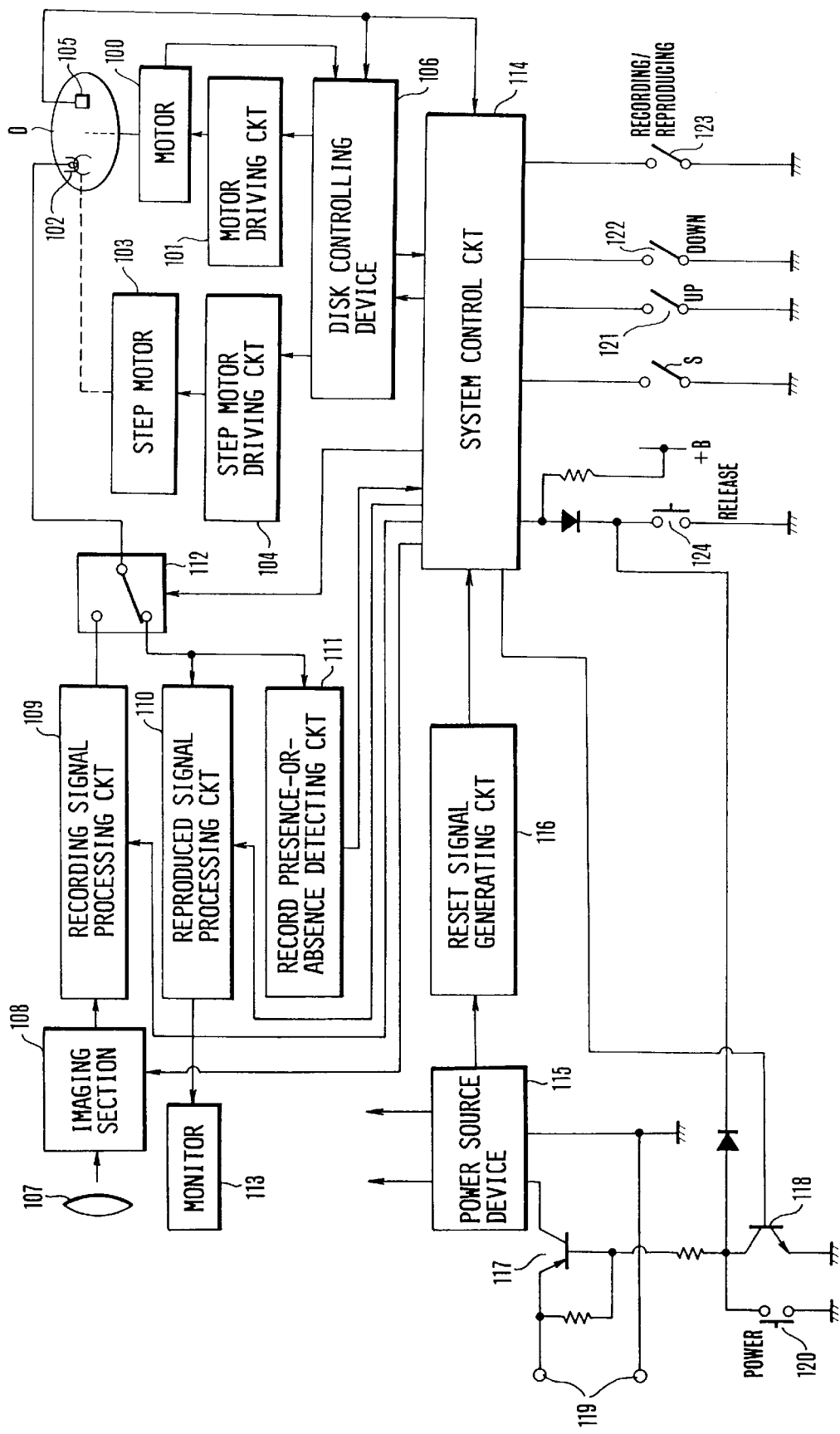
FIG. 11 is a block diagram showing a recording or reproducing apparatus in which the power source discriminating device is used for the control of auto shut-off operation.
Figure 12A:
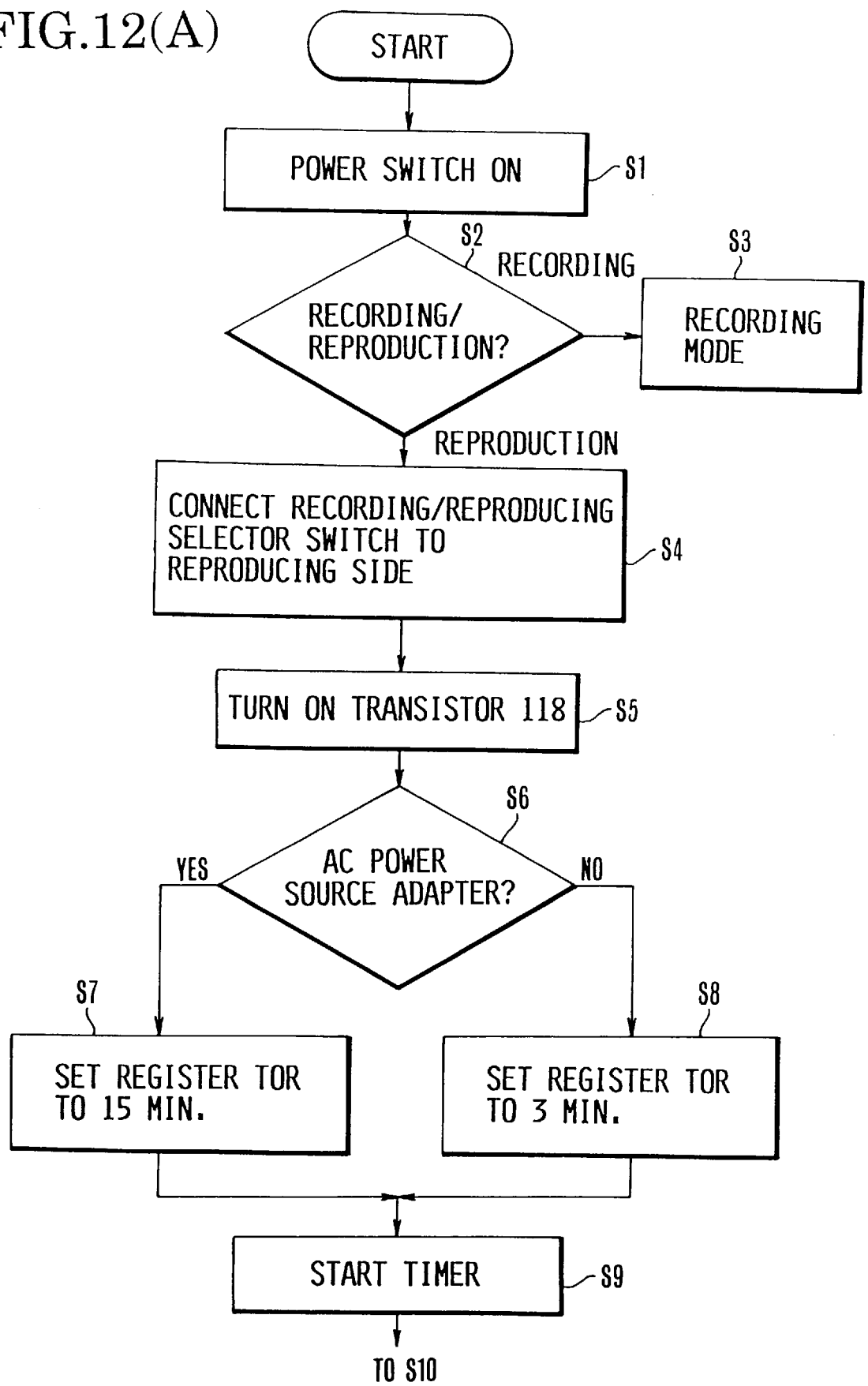
FIGS. 12(A) and 12(B) flow charts which serve to illustrate the operation of the apparatus shown in FIG. 11.
Figure 12B:
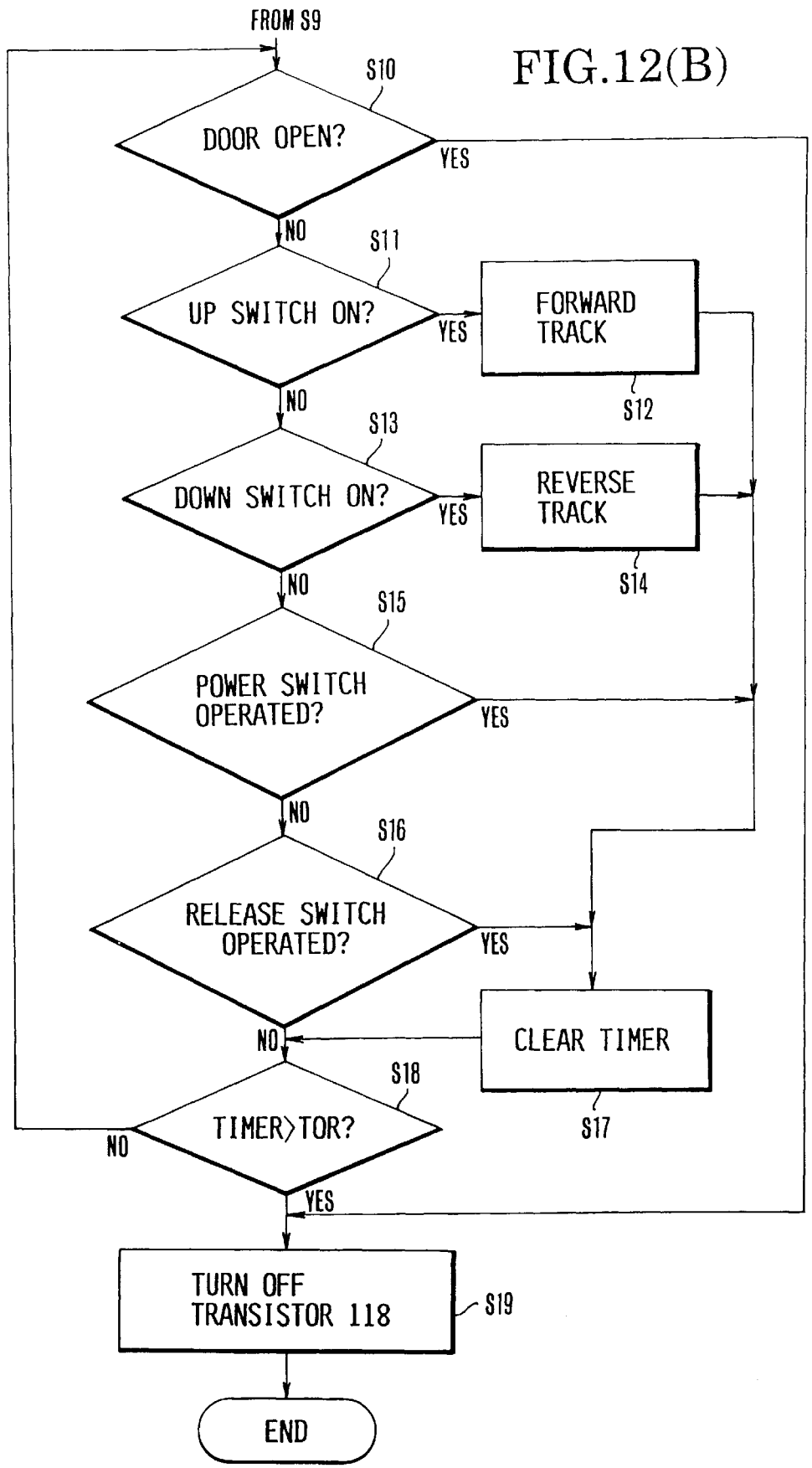

FIG. 11 is a block diagram showing the construction of a recording or reproducing apparatus according to the embodiment of the present invention, with FIGS. 12(A) and 12(B) being flow charts showing the essential operation of the embodiment of the present invention.

FIG. 11 is a block diagram showing an example in which a recording or reproducing apparatus according to the present invention is applied to an electronic camera arranged to record image information or sound information on concentric tracks on a magnetic disc or to reproduce the information from the same.

Referring to FIG. 11, a magnetic disc serving as a recording medium is denoted by D, and a disc rotating motor 100 is arranged to rotate the magnetic disc D. A motor driving circuit 101 is disposed to control the rotary motion of the motor 100. A magnetic head 102 is arranged to move back and forth in the radial direction of the rotating magnetic disc D to effect recording or reproduction on or from concentric tracks. A step motor 103 serves as a head movement mechanism for causing the magnetic head 102 to move to a desired track position on the magnetic disc D. A step motor driving circuit 104 is arranged to drive the step motor 103. A PG coil 105 is disposed to detect the position of a vertical synchronizing signal according to the rotation of the disc D and generate a PG pulse representative of the corresponding phase of rotation. A disc controlling device 106 controls the motor driving circuit 101 and hence the rotary motion of the motor 100 on the basis of the PG pulse output from the PG coil 105, the FG pulse output from the motor 100, and a command given by a system control circuit 114 which will be described later. In accordance with the command of the system control circuit 114, the disc controlling device 106 further controls the step motor driving circuit 104, thereby controlling the position of the magnetic head 102.

An optical system 107 is constituted by an optical system including a photographing lens, a diaphragm, a shutter and so forth. An imaging section 108 is constituted by an imaging device for converting the image information photographed by the optical system 107 into electrical signals. A recording signal processing circuit 109 operates under the control of a control signal supplied from the system control circuit 114 which will be described later, and is arranged to effect processings such as frequency modulation and emphasis on the image information signal output from the imaging section 108, convert the signal into a signal suitable for recording on the magnetic disc D, and supply the converted signal to the magnetic head 22. A reproduced signal processing circuit 110 operates under the control of a control signal supplied from the system control circuit 114, and is arranged to convert the image signal, which has been reproduced from a track on the magnetic disc D by the magnetic head 102, into the original image signal by effecting predetermined signal processings such as frequency demodulation and deemphasis, convert the signal into a signal suitable for supply to a monitor 113, and output the thus-converted signal to the monitor 113. A record presence-or-absence detecting circuit 111 serves to detect the presence or absence of a record on a track on the disc D. A recording/reproducing selector switch 112 selectively connects the recording signal processing circuit 109 and the reproduced signal processing circuit 110 to the magnetic head 102 in accordance with a control signal from the system control circuit 114.

The system control circuit 114 provides control over the operation of the overall system of the recording or reproducing apparatus, such as the disc controlling device 106, the recording signal processing circuit 109, the reproduced signal processing circuit 110, the imaging section 101 and the recording/reproducing selector switch 112. The system control circuit 114 is constituted by a microcomputer, a ROM in which a control program is stored, a RAM used for performing arithmetic operations on data, and so forth. A power source device 115 is disposed to supply electrical power to the overall system. A reset signal generating circuit 116 is responsive to the on-off action of the power source device 115 for generating a reset signal to be supplied to the system control circuit 114. Switching transistors 117 and 118 serve to supply electrical power of a power source connected to power supply terminals 119 to the power source device 115. A power switch 120 is switched on to supply the electrical power of the power source to the system. A power source discriminating switch S which will be described in detail later is disposed to discriminate between the electrical power supplied from an AC power source adapter and that supplied from a battery. An UP switch 121 and a DOWN switch 122 are operated to shift track numbers upwardly and downwardly, respectively, in order to select a desired track while the disc D is being reproduced. Reference numeral 123 denotes a recording/reproducing selector switch, and reference numeral 124 denotes a release switch operated to execute recording operation.

In the embodiment shown in FIG. 11, the switch S is the same as the switch S which constitutes the power source discriminating means explained in connection with FIGS. 5 to 7 as well as FIGS. 9 and 10.

The recording or reproducing apparatus according to this embodiment has the arrangement and construction described above. In a recording mode, after the power switch 120 is switched on, the recording/reproducing selector switch 123 is switched to a recording side to connect the recording signal processing circuit 102 to the magnetic head 102 through the switch 112. Simultaneously, each of the imaging section 108 and the disc controlling device 106 is set to a predetermined state which enables recording operation. Thus, an image photographed in accordance with the operating timing of the release switch 124 is recorded on the magnetic disc D.

Reproducing operation which constitutes a part of the essential operation of this embodiment will be described below with reference to the flow charts shown in FIGS. 12(A) and 12(B).

In Step S1, when the power switch 120 is switched on, the transistor 117 is turned on and electrical power is supplied from the power supply terminal 119 to the power source device 115. Thus, the electrical power is supplied to the overall system.

In Step S2, the state of the recording/reproducing selector switch 123 is checked. If the recording side is selected, the process proceeds to Step S3, in which the system connects the magnetic head 102 to the recording signal processing circuit 109 through the recording/reproducing selector switch 112, thereby enabling the image information imaged by the imaging section 108 to be recorded on the magnetic disc D. On the other hand, if the recording/reproducing selector switch 123 is connected to its reproducing side, the process proceeds to Step S4, in which the system connects the magnetic head 102 to the reproduced signal processing circuit 110 through the recording/reproducing selector switch 112, thereby reproducing the information recorded on a track on the magnetic disc D.

When the transistor 117 is turned on and the electrical power is supplied to the system, the process proceeds to Step S5. In Step S5, the system control circuit 114 turns on the transistor 118 and maintains the supply of electrical power even when the switch 120 is switched off. During this time, the system control circuit 114 checks the state of the power source discriminating switch S (in Step S6). If the power source employed in the system is an AC power source adapter whose consumption of electrical power is not a critical problem, the process proceeds to Step S7, in which a register TOR (time-out register) for setting the time required to automatically shut off the reproducing operation is set to, for example, 15 minutes. If the power source is not such an AC power source adapter (but a battery whose power consumption is critical), the process proceeds to Step S8, in which the register TOR is set to 3 minutes. If the power source is, as described above, the AC power source adapter, the power source discriminating switch S is switched on and supplies a low-level signal to the system control circuit 114. If the power source is not an AC power source adapter (but a battery), the power source discriminating switch S is switched off and supplies a high-level signal to the system control circuit 114. Thus, it is possible to discriminate the kind of a power source employed.

After the auto shut-off time has been set, the process proceeds to Step S9, in which a timer in the system control circuit 114 is started and counting of reproducing time is initiated. Subsequently, in Step S10, it is checked whether or not the door of a disc accommodating section (not shown) is open, that is, whether or not the disc D has been ejected. If the disc D has been ejected or replaced or if the door is open, the process jumps to Step S19, in which the transistor 118 is turned off to shut off the power of the system, thus completing the flow. If the door is not open, the process proceeds to Step S11, in which the state of the UP switch 121 for selection of a track to be reproduced is checked. If the UP switch 121 is on, tracks are forwarded in Step S12 to select the desired track. If the UP switch 121 is off, the process proceeds to Step S13, in which the state of the DOWN switch 122 for selection of a track to be reproduced is checked. If the DOWN switch 122 is on, tracks are reversed in Step S14 to select the desired track. If either the UP switch 121 or the DOWN switch 122 is operated, the process proceeds to Step S17, in which the timer in the system control circuit 114 is cleared, and then proceeds to Step S18.

On the other hand, if neither the UP switch 121 nor the DOWN switch 122 is operated in Step S11 or S13, the states of the power switch 120 and the release switch 124 are checked in Steps S15 and S16, respectively. If neither of them is operated, the process proceeds to Step S18, while, if either of them is operated, the process proceeds to Step S17, in which the timer is cleared and then causes the process to proceed to Step S18. In other words, if any one of the above switches is operated, the count of the timer is cleared and counting is again started from "0". Incidentally, the aforesaid action of "operating" the power switch 120 or the release switch 124 does not indicate the normal action of switching on the power switch 120 or operating the release switch 124 to effect photography. In other words, the "operating" of such a switch during reproduction means that, if such a switch is "operated" during reproduction, the timer can be cleared.

In Step S18, the count of the timer is compared with the set time of the register TOR and, if the elapsed time of the timer is equal to or greater than the set time of the register TOR, the process proceeds to Step S19, in which the transistor 118 is turned off, thus shutting off the power source of the system. If the elapsed time of the timer has not yet reached the set time of the register TOR, the process returns to Step S10 and, subsequently, the above operations are repeated until the count of the timer reaches the set time of the register TOR.

As described above, during reproduction, it is determined, by the above discriminating process, whether the power source in use is an AC power source adapter whose consumption of the electrical power is not critical or a battery whose power consumption is critical, and the auto shut-off time is set in accordance with the kind of a power source. Accordingly, it is possible to prevent unwanted consumption of the power of the battery. Where a power source whose power consumption is not critical is in use, complicated operation can be removed by extending continuous reproducing time. In either case, if any operating switch is operated during reproduction, the count of reproducing time is cleared and it is also possible, therefore, to continue the reproducing operation as required.

Incidentally, when an AC power source adapter is in use, since it is not necessary to take account of the consumption of the electrical power, the auto shut-off time may be set to a time within which no abrasion occurs in the magnetic head 102 or the magnetic disc D. When a battery is to be used, the auto shut-off time may be determined by taking account of the consumption of the battery. Accordingly, the auto shut-off time is not limited to the above set times such as 15 minutes and 3 minutes, and may be altered as occasion demands.

The above embodiment has been explained with reference to the case where it is necessary to discriminate between the battery and the AC power source adapter, but the combination of the battery and the AC power source adapter is not a restrictive one. The range of applications of the above-described embodiment is wide and, therefore, it can be combined with another type of DC power source adapter having a different voltage level, another type of battery having a different capacity, an externally connected battery having a large capacity, or the like.

The above embodiment has been explained with reference to the case where it is necessary to discriminate between two kinds of power sources. However, it is possible to discriminate more than two kinds of power sources by altering the number of discriminating electrodes and contact pieces as well as the positions at which they are formed.

In accordance with the present invention which provides the above-described recording or reproducing apparatus, means for discriminating the kind of a power source is disposed in an electronic apparatus capable of using a plurality of power sources including a battery and a power source different from the battery, for example, an AC power source adapter. The auto shut-off time during reproduction is varied in accordance with the result of discrimination of the kinds of power source. If it is determined, as the result of the discrimination, that electrical power is supplied from a battery whose power consumption is a critical problem, the auto shut-off time is shortened to prevent unnecessary power consumption. If it is determined, as the result of the discrimination, that electrical power is supplied from an AC power source adapter whose power consumption is not critical, the auto shut-off time is extended within a range in which abrasion does not occur in the magnetic head or the recording medium, whereby complicated operation can be removed. Accordingly, it is possible to realize improvements in both the consumption of the power source and the operability of the apparatus. In addition, it is possible to realize the power source discriminating means at low cost and with a simple construction. Since discrimination information obtained by the power source discriminating means may be applied to various forms of control, it is possible to provide highly reliable devices. In addition, since it is possible to construct the means for discriminating the kind of a power source without any need to form a special space in an electronic apparatus, the present invention provides the effect of enabling a reduction in the overall size of the electronic apparatus.

Incidentally, each of the embodiments is explained with reference to the case where the present invention is applied to the electronic camera, but the present invention is not limited solely to such an arrangement. It will be understood that the present invention can be applied to any recording or reproducing apparatus other than the electronic camera.

What is claimed is:

1. An electronic apparatus, comprising:
   (A) reproducing means for reproducing an image recorded on a recording medium;
   (B) selection means for selecting the image;
   (C) a timer for counting lapse of a predetermined time; and
   (D) control means for controlling the timer to clear when image selection operation of the selection means is performed during the counting operation of the predetermined time by the timer, and controlling a power source of the timer to automatically turn off when the lapse of the predetermined time is counted by the timer without the selection operation by the selection means.

2. An electronic apparatus according to claim 1, wherein the selection means comprises an upswitch and a downswitch.

3. An electronic apparatus according to claim 2, further comprising image pickup means and recording means for recording the image picked up by the pickup means on the recording medium.

4. An electronic apparatus according to claim 1, further comprising image pickup means and recording means for recording the image picked up by the pickup means on the recording medium.

* * * * *

UNITED STATES PATENT AND TRADEMARK OFFICE
CERTIFICATE OF CORRECTION

PATENT NO. : 6,128,040
DATED : October 3, 2000
INVENTOR(S) : Kenichi Shinbori, et al.

Page 1 of 1

It is certified that error appears in the above-identified patent and that said Letters Patent is hereby corrected as shown below:

Title page,
Item [30], line 4, delete "Feb. 12, 1999" and insert -- Feb. 12, 1988 --.

Column 6,
Line 23, "FIG. 6" does not start with a new paragraph.

Signed and Sealed this

Eighteenth Day of December, 2001

Attest:

Attesting Officer

JAMES E. ROGAN
*Director of the United States Patent and Trademark Office*